(12) United States Patent
Cricrì et al.

(10) Patent No.: US 11,188,783 B2
(45) Date of Patent: Nov. 30, 2021

(54) REVERSE NEURAL NETWORK FOR OBJECT RE-IDENTIFICATION

(71) Applicant: Nokia Technologies Oy, Espoo (FI)

(72) Inventors: Francesco Cricrì, Tampere (FI); Emre Aksu, Tampere (FI); Xingyang Ni, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 39 days.

(21) Appl. No.: 16/156,928

(22) Filed: Oct. 10, 2018

(65) Prior Publication Data

US 2019/0122072 A1   Apr. 25, 2019

(30) Foreign Application Priority Data

Oct. 19, 2017   (FI) ...................................... 20175924

(51) Int. Cl.
*G06K 9/62* (2006.01)
*G06K 9/00* (2006.01)
(Continued)

(52) U.S. Cl.
CPC ....... *G06K 9/6215* (2013.01); *G06K 9/00624* (2013.01); *G06K 9/00744* (2013.01);
(Continued)

(58) Field of Classification Search
CPC .... G06N 3/0454; G06N 3/0472; G06N 3/088; G06N 3/0481; G06N 3/08; G06N 3/084; G06N 7/005; G06N 20/00; G06N 3/04; G06K 9/6267; G06K 9/628; G06K 9/00281; G06K 9/00288; G06K 9/00624; G06K 9/00744; G06K 9/00791; G06K 9/4628; G06K 9/6215; G06K 9/6255; G06K 9/6257; G06K 9/627; G06K 9/6271; G06K 9/6277; G06K 9/6232; G06K 9/6256; G06K 9/6274; G06K 2209/23; G06K 9/6269; G06K 9/00369; G06K 9/4642;
(Continued)

(56) References Cited

U.S. PATENT DOCUMENTS 10,210,631 B1 * 2/2019 Cinnamon ............ G06T 11/003
2010/0296728 A1 * 11/2010 Ohtani ................. G06K 9/6257
382/159

(Continued)

OTHER PUBLICATIONS

Liu et al, Face Aging with Contextual Generative Adversarial Nets, MM'17, Oct. 23-27, 2017, Mountain View, CA, USA (Year: 2017).*
(Continued)

*Primary Examiner* — Andrae S Allison
(74) *Attorney, Agent, or Firm* — Alston & Bird LLP

(57) ABSTRACT

The invention relates to a method comprising receiving, by a neural network, a first image comprising at least one target object; receiving, by the neural network, a second image comprising at least one query object; and determining, by the neural network, whether the query object corresponds to the target object, wherein the neural network comprises a discriminator neural network of a generative adversarial network (GAN). The invention further relates to an apparatus and a computer program product that perform the method.

21 Claims, 5 Drawing Sheets

(51) Int. Cl.
*G06N 3/04* (2006.01)
*G06N 3/08* (2006.01)
*G06K 9/46* (2006.01)

(52) U.S. Cl.
CPC ............ *G06K 9/4628* (2013.01); *G06K 9/627* (2013.01); *G06K 9/6255* (2013.01); *G06K 9/6277* (2013.01); *G06N 3/04* (2013.01); *G06N 3/0454* (2013.01); *G06N 3/0472* (2013.01); *G06N 3/08* (2013.01); *G06N 3/088* (2013.01); *G06K 9/00281* (2013.01); *G06K 9/00288* (2013.01); *G06K 9/6257* (2013.01)

(58) Field of Classification Search
CPC ............. G06K 9/00228; G06K 9/6296; G06K 9/00778; G06K 9/46; G05D 1/0088; G05D 1/0214; G05D 1/0221; G05D 2201/0213; G06T 2207/20081; G06T 2207/20084; G06T 7/246; G06T 7/73; G06T 11/003; G06T 9/002; G06F 16/738; G06F 40/279; G06F 16/583; G01V 5/00; G01B 11/002
USPC .......................... 382/103, 159, 188, 199, 269
See application file for complete search history.

(56) References Cited

U.S. PATENT DOCUMENTS

| | | | | |
|---|---|---|---|---|
| 2012/0170808 | A1* | 7/2012 | Ogata | G06K 9/00798 382/103 |
| 2017/0032538 | A1* | 2/2017 | Ernst | G06T 7/0012 |
| 2017/0061625 | A1* | 3/2017 | Estrada | G06N 3/0454 |
| 2017/0116511 | A1* | 4/2017 | Kim | H04L 12/2825 |
| 2017/0316285 | A1* | 11/2017 | Ahmed | G06K 9/6223 |
| 2018/0129917 | A1* | 5/2018 | Chu | G06N 3/08 |
| 2018/0165554 | A1* | 6/2018 | Zhang | G06K 9/6256 |
| 2018/0253866 | A1* | 9/2018 | Jain | G06N 3/0454 |
| 2019/0080205 | A1* | 3/2019 | Kaufhold | G06K 9/6257 |

OTHER PUBLICATIONS

Z. Zhang, Y. Song, and H. Qi. Age progression/regression by conditional adversarial autoencoder. In Proceedings of the IEEE Conference on Computer Vision and Pattern Recognition, pp. 5810-5818, 2017 (Year: 2017).*

X. Tang, Z. Wang, W. Luo and S. Gao, "Face Aging with Identity-Preserved Conditional Generative Adversarial Networks," 2018 IEEE/CVF Conference on Computer Vision and Pattern Recognition, Salt Lake City, UT, 2018, pp. 7939-7947, doi: 10.1109/CVPR.2018.00828. (Year: 2018).*

Li, Zhigang, and Yupin Luo. "Generate identity-preserving faces by generative adversarial networks." arXiv preprint arXiv: 1706.03227 (Jun. 25, 2017). (Year: 2017).*

S. Hu, N. J. Short, B. S. Riggan, C. Gordon, K. P. Gurton, M. Thielke, et al., "A polarimetric thermal database for face recognition research", CVPRW, pp. 119-126, 2016. (Year: 2016).*

Schroff et al., "FaceNet: A Unified Embedding for Face Recognition and Clustering", IEEE Conference on Computer Vision and Pattern Recognition (CVPR), Jun. 17, 2015, 10 pages.

Bengio et al., "The Manifold Perspective on Representation Learning", Deep Learning, MIT Press, 2015, pp. 523-539.

Kirkpatrick et al., "Overcoming Catastrophic Forgetting in Neural Networks", Proceeding of the National Academy of Sciences of the United Sates of America (PNAS), Mar. 28, 2017, vol. 114, No. 13, pp. 3521-3526.

Finnish Application No. 20175726, "A Method for Image Processing", filed on Aug. 14, 2017, 20 pages.

Office action received for corresponding Finnish Application No. 20175924, dated May 21, 2018, 8 pages.

Zheng et al., "Unlabeled Samples Generated by GAN Improve the Person Re-identification Baseline in vitro", International Conference on Computer Vision (ICCV), Aug. 22, 2017, 9 pages.

Tran et al., "Disentangled Representation Learning GAN for Pose-Invariant Face Recognition", IEEE Conference on Computer Vision and Pattern Recognition (CVPR), Jul. 21-26, 2017, pp. 1415-1424.

Li et al., "Generative Face Completion", IEEE Conference on Computer Vision and Pattern Recognition (CVPR), Apr. 19, 2017, pp. 1-9.

Zhao et al., "Robust LSTM-Autoencoders for Face De-Occlusion in the Wild", IEEE Transactions on Image Processing, vol. 27, No. 2, Dec. 27, 2016, pp. 1-11.

Tung et al., "Adversarial Inverse Graphics Networks: Learning 2D-to-3D Lifting and Image-to-Image Translation from Unpaired Supervision", IEEE International Conference on Computer Vision (ICCV), Aug. 16, 2017, 14 pages.

Huang et al., "Beyond Face Rotation: Global and Local Perception GAN for Photorealistic and Identity Preserving Frontal View Synthesis", IEEE International Conference on Computer Vision (ICCV), 2017, pp. 2439-2448.

Donahue et al., "Adversarial Feature Learning", International Conference on Learning Representations, arXiv, Apr. 3, 2017, pp. 1-18.

Izenman, A. J., *Introduction to Manifold Learning*, Wires Computation Statistics, vol. 4, (2012) 439-446.

Zheng, N. et al., *Manifold Learning*, Statistical Learning and Pattern Analysis for Image and Video Processing (2009) 87-119.

* cited by examiner

REVERSE NEURAL NETWORK FOR OBJECT RE-IDENTIFICATION

TECHNICAL FIELD

The present invention relates to neural networks, and more particularly to a method for neural network-based re-identification of objects, also sometimes referred to as verification of identity of objects or simply object verification.

BACKGROUND

Object detection is a computer technology relating to computer vision and image processing and detecting objects of certain object classes such as humans, eyes, buildings, or cars in digital images and videos. Every object class has its own specific features on the basis of which they are classified to an object class. For example, when classifying/detecting of faces, eyes, nose, and lips should be found, before an object is classified as a face object class or detected from an image as a face.

However, in many cases, there is a need to re-identify a certain object. An object re-identification is a task of assigning a unique ID to different views of the same object class instance. For example, if a considered object class is a car and a set of images shows several cars, the same unique ID is desired to assign to a certain car appearing in multiple images of that set of images And in a case of persons, the same unique ID is desired to be assigned to the views that are in different images of the same person, and different IDs to different persons.

This re-identification may be used for various applications, such as verifying the identity of a person or for video object tracking when desired to check if an appearing person was seen before or in other part of the video. A problem of a re-identification is that most datasets suitable to be used for training re-identification systems are originally collected for a different purpose than re-identification, namely object detecting. Therefore, these datasets may not be capable to identify whether at least two very similar objects are the same object or not.

SUMMARY

Now there has been invented an improved method and technical equipment implementing the method, by which the above problems are alleviated. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method, comprising: receiving, by a neural network, a first image comprising at least one target object; receiving, by the neural network, a second image comprising at least one query object; determining, by the neural network, whether the query object corresponds to the target object, wherein the neural network comprises a discriminator neural network of a generative adversarial network (GAN).

According to an embodiment, the second image comprises at least a portion of a current video frame and the first image comprises at least a portion of a previous video frame. According to an embodiment, the discriminator neural network is trained by using a generator neural network configured to receive a modified version of the previous video frame and to provide an estimate of the current video frame to the discriminator neural network. According to an embodiment, the modification of the previous video frame comprises extracting at least one characterizing feature from the previous video frame. According to an embodiment, the discriminator neural network is trained by using a generator neural network configured to receive a modified version of the first image, wherein at least one characterizing feature of the target object is extracted in order to generate the second image to the discriminator neural network. According to an embodiment, the characterizing feature is a nose, eyes or lips of a face. According to an embodiment, the generator neural network is trained by a second discriminator neural network configured to determine whether the estimate of the current video frame generated by the generator neural network is realistic or fake.

According to a second aspect, there is provided an apparatus comprising at least one processor, memory including computer program code, the memory and the computer program code configured to, with the at least one processor, cause the apparatus to perform the method a method, comprising: receiving, by a neural network, a first image comprising at least one target object; receiving, by the neural network, a second image comprising at least one query object; determining, by the neural network, whether the query object corresponds to the target object, wherein the neural network comprises a discriminator neural network of a generative adversarial network (GAN).

According to an embodiment, the second image comprises at least a portion of a current video frame and the first image comprises at least a portion of a previous video frame. According to an embodiment, the discriminator neural network is trained by using a generator neural network configured to receive a modified version of the previous video frame and to provide an estimate of the current video frame to the discriminator neural network. According to an embodiment, the modification of the previous video frame comprises extracting at least one characterizing feature from the previous video frame. According to an embodiment, the discriminator neural network is trained by using a generator neural network configured to receive a modified version of the first image, wherein at least one characterizing feature of the target object is extracted in order to generate the second image to the discriminator neural network. According to an embodiment, the characterizing feature is a nose, eyes or lips of a face. According to an embodiment, the generator neural network is trained by a second discriminator neural network configured to determine whether the estimate of the current video frame generated by the generator neural network is realistic or fake.

According to a third aspect, there is provided a computer program product embodied on a non-transitory computer readable medium, comprising computer program code configured to, when executed on at least one processor, cause an apparatus or a system to perform the method a method, comprising: receiving, by a neural network, a first image comprising at least one target object; receiving, by the neural network, a second image comprising at least one query object; determining, by the neural network, whether the query object corresponds to the target object, wherein the neural network comprises a discriminator neural network of a generative adversarial network (GAN).

According to an embodiment, the second image comprises at least a portion of a current video frame and the first image comprises at least a portion of a previous video frame. According to an embodiment, the discriminator neural network is trained by using a generator neural network configured to receive a modified version of the previous video frame and to provide an estimate of the current video frame to the discriminator neural network. According to an embodiment, the modification of the previous video frame comprises extracting at least one characterizing feature from the previous video frame. According to an embodiment, the discriminator neural network is trained by using a generator neural network configured to receive a modified version of the first image, wherein at least one characterizing feature of the target object is extracted in order to generate the second image to the discriminator neural network. According to an embodiment, the characterizing feature is a nose, eyes or lips of a face. According to an embodiment, the generator neural network is trained by a second discriminator neural network configured to determine whether the estimate of the current video frame generated by the generator neural network is realistic or fake.

According to a fourth aspect, there is provided an apparatus comprising: means for receiving a first image comprising at least one target object; means for receiving a second image comprising at least one query object; means determining whether the query object corresponds to the target object, wherein the neural network comprises a discriminator neural network of a generative adversarial network (GAN).

According to an embodiment, the apparatus further comprises means for performing the embodiments of the first aspect.

DESCRIPTION OF THE DRAWINGS

In the following, various embodiments of the invention will be described in more detail with reference to the appended drawings, in which.

DETAILED DESCRIPTION

Figure 1A:
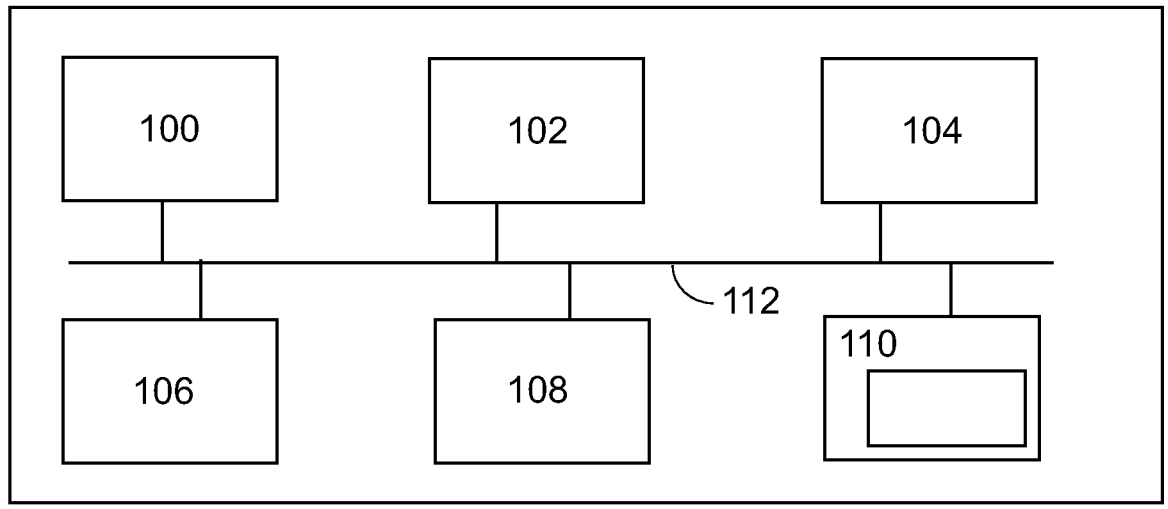
FIG. 1a shows a computer graphics system suitable to be used in a neural network according to an embodiment.

Object detection comprises automatic analyzing of an image to determine whether an object of a certain object class such as chair, car, computer, etc. is present in the image. In many cases, that is not enough and there is a further need to re-detect i.e. re-identify an object i.e. a so-called target object from a second image after detecting it from a first image. This operation may be called as object re-identification. Object re-identification is a task of assigning unique identifying information (ID) to different views of the same object in at least two different images. For example, if a set of images shows several cars, the same unique ID is desired to assign to a certain car appearing in at least two images of the set of images And in a case of persons, the same unique ID is desired to be assigned to a certain person in different images of the same person, and different IDs to different persons appearing in at least one image of the images. Herein the term 'image' may refer to any digital image captured as a still image or as a video frame of a video file.

People are very good at distinguishing between objects and therefore also re-identifying objects. In the case of persons, there might be very similarly-looking faces, but people are able to capture differences especially in some key areas or features, such as, nose, eyes, lips, etc. On the other hand, people are further able to overlook areas or features and/or modifications of those areas or features, which are less important for the identification or which are less stable and may even change for the same object. Those features may be, for example, hair-style, slight skin colour change, piercing, beard, make-up etc. In other words, people are capable for re-identify objects despite some changes in objects. However, when distinguishing between objects is arranged to be done by devices, they need to be trained for that in order to achieve a reliable re-identification method.

Artificial neural networks may be used for first extracting features and second for classifying the extracted features to object classes and third perform object re-identifying. One approach for the analysis of data is deep learning. Deep learning is an area of machine learning which involves artificial neural networks. Deep learning typically involves learning of multiple layers of nonlinear processing units, either in supervised or in unsupervised manner. These layers form a hierarchy of layers, which represents the artificial neural network (also referred to just as neural network). Each learned layer extracts feature representations from the input data, where features from lower layers represent low-level semantics, and features from higher layers represent high-level semantics (i.e. more abstract concepts). Unsupervised learning applications typically include pattern analysis, whereas supervised learning applications typically include classification of media objects.

As already mentioned above, object re-identification may be used for various applications, such as verifying the identity of a person when having multiple images of that person, or for video object tracking when desired to check if an appearing person was seen before or in other part of the video file. But as the data of most datasets is originally collected for object detection instead of an object re-identification, there is a need for a novel approach for training artificial neural networks by using difficult and/or "edge" objects and by putting artificial neural networks performing re-identification in stress conditions in order to create datasets that are more suitable to be used for object re-identification and performing the object re-identification. In this context, the term "edge case" refers to images of very similar, but still different, views of the same object and term "stress conditions" means a situation, when artificial neural networks have to identify whether at least two very similar looking objects in different images are the same object or not. The novel approach comprises generating of edge-case training object samples for training a re-identification model.

The training according to an embodiment may be performed by using a Generative Adversarial Network (GAN). A GAN is a special kind of deep neural network that allows generating consistent content samples. A GAN includes at least two neural networks: a generator and a discriminator that compete against each other, where the generator generates content and the discriminator distinguishes between generated and real content. In GANs, the discriminator neural network is used for providing the loss to the generator network, in a minimax-like game. Other variants of GANs exist, where, for example, the discriminator neural network is considered a critic, which does not classify between real and generated samples, but provides an estimate of the distance between the probability distributions of the real training data and the generated data.

As generally known, neural networks are trained to operate in desired manner. In the system according to embodiments of the invention the discriminator neural network of the GAN used for training and re-identification performs the actual re-identification and the generator is a neural network used as an auxiliary network providing edge-case training samples for the discriminator, i.e., images similar to a target object but not the same. The target object is the object arranged to be identified from images or video frames. In order to account also for realistic-looking samples, a second discriminator is brought to the GAN according to embodiments of the invention.

Several embodiments of the invention are described herein in the context of a device, a method, and a computer-readable medium comprising a computer program stored therein, by which the above problems are alleviated. It is to be noted that different embodiments may have applications widely in any environment where an apparatus is suitable for performing object re-identification. In embodiments, the device may be used for training re-identification systems in order to improve results and reliability of object re-identification. Result(s) of the re-identification, for example the unique ID assigned to an object in a plurality of images or video frames or a position of the identified object in the plurality of images or video frames, may be provided as an output to other parts or components of the computer graphics system. For example, the re-identification result and position information may be used to track a position of an object. As another example, the unique identifier associated with an object may be displayed to the user, for example overlaid on the plurality of images or video frames.

FIG. 1a shows a computer graphics system suitable to be used in image processing, for example, in object re-identification and for training a re-identification system according to an embodiment. The generalized structure of the computer graphics system will be explained in accordance with the functional blocks of the system. For a skilled person, it will be obvious that several functionalities can be carried out with a single physical device, e.g. all calculation procedures can be performed in a single processor, if desired. A data processing system of an apparatus according to an example of FIG. 1 includes a main processing unit 100, a memory 102, a storage device 104, an input device 106, an output device 108, and a graphics subsystem 110, which all are connected to each other via a data bus 112.

The main processing unit 100 may comprise processing unit circuitry configured to process data within the data processing system. The memory 102, the storage device 104, the input device 106, and the output device 108 may include conventional components and circuitry as recognized by those skilled in the art. The memory 102 and storage device 104 store data within the data processing system 100. Computer program code resides in the memory 102 for implementing, for example, computer vision process. The input device 106 inputs data into the system while the output device 108 receives data from the data processing system and forwards the data, for example, to a display. The data bus 112, while shown as a single line, may be a combination of a processor bus, a PCI bus, a graphical bus, and an ISA bus. Accordingly, a skilled person readily recognizes that the apparatus may be any data processing device, such as a computer device, a personal computer, a server computer, a mobile phone, a smart phone, a radio transmitter, a radio receiver or an Internet access device, for example Internet tablet computer. The input data of the computer vision process according to an embodiment and means for obtaining the input data are described further below.

It needs to be understood that different embodiments allow different parts to be carried out in different elements.

For example, various processes may be carried out in one or more processing devices; for example, entirely in one computer device, or in one server device or across multiple user devices. The elements of data compression process may be implemented as a software component residing on one device or distributed across several devices, as mentioned above, for example so that the devices form a computer cloud.

One approach for the analysis of data is deep learning. Deep learning is an area of machine learning which involves artificial neural networks. Deep learning typically involves learning of multiple layers of nonlinear processing units, either in supervised or in unsupervised manner. These layers form a hierarchy of layers, which represents the artificial neural network (also referred to just as neural network). Each learned layer extracts feature representations from the input data, where features from lower layers represent low-level semantics, and features from higher layers represent high-level semantics (i.e. more abstract concepts). Unsupervised learning applications typically include pattern analysis, whereas supervised learning applications typically include classification of media objects.

A re-identification model may be implemented by training a discriminator neural network receiving two inputs, a target object and a query object. The query object is either the same real (i.e., not generated by a neural network) object as the target object, but in a different image or video image frame, or it is an object generated by a neural network or other generative model.

Training of the system according to an embodiment may be done by a neural network that is a Generative Adversarial Network, where the logic is reversed and thus it may be referred to as a reverse GAN or rGAN in addition to just a GAN. The difference between classical GAN and an rGAN according to an embodiment relates to settings. In classical GAN, a generator G is the model of interest and the discriminator is the auxiliary model. In rGAN, a generator G is the auxiliary model and the discriminator is the model of interest. In rGAN, the goal of a generator G is to try to make the identification hard for the re-identification model by generating query object samples which are very similar to the target object but, at the same time, sufficiently different in key areas or features. By providing generated object samples which are very similar to target object samples it is possible to make the task of the re-identification model difficult and thus train it more effectively. The discriminator D of a rGAN is arranged to learn to distinguish objects correctly (i.e., to provide their correct ID), the discriminator D performing the re-identification may be referred as D1. Once D1 is trained, the generator G may be kept for further training of the rGAN and the discriminator D1 may be used for re-identification.

In training phase of the rGAN, the generator G is trained to minimize the predictability of inputs of the discriminator D1. This may be referred to as predictability minimization. The discriminator D1 is trained to maximize this predictability. There are several variants of the classic GAN setting, especially regarding the discriminator. For example, a discriminator may output an estimate of the distance between the target distribution and the generated distribution. Using such discriminator may not provide a re-identification result, for example, a binary classification directly, but it may still provide useful information about the distance or difference between the target object and query object samples.

In one embodiment of the invention, in order to have the generator G generate object samples having differences in the key features with respect to the target objects, the network comprises one more feature extracting component, which one more feature extracting component is arranged to extract one or more key features from a target object of a received image. An extracted key feature may be, for example, in a case of a person; eyes, mouth, nose, etc. and in a case of a car; a bomber, a radiator grille, side mirrors, etc. This extracting component may be, for example, a face landmark detection algorithm that is implemented as a pre-trained neural network or an artificial occlusion algorithm. Once the key features are extracted, those key features will be hidden to the generator, for example by removing their visual content and replacing it with either visual noise (e.g., sampled from a noise distribution) or a fixed visual pattern (e.g., a single color). In addition, the generator may be provided with an additional data sample which represents information about the location of the removed data. For example, this can be in the form of a binary image mask.

There may also be a case, where key features of query images generated by the generator of a neural network look different than key features of the target object, but those generated key areas do not look realistic. Actually, as the real-world visual data lives on a low-dimensional manifold, the combinations of pixels for non-realistic visual data may be much more than for realistic visual data, and thus are more likely to be generated. In other words, if the generator sampled pixels randomly, it would generate non-realistic visual content with much higher probability than it would generate realistic visual content. Thus, the generator needs to learn to sample from the data probability distribution, and this is accomplished by having a second discriminator D2 according to embodiments of the invention. The second discriminator D2 is arranged to discriminate whether objects in its input images are realistic or not. This is done by implementing D2 as a trainable binary classifier, such as a Convolutional Neural Network, which would receive either a generated sample or a real sample and it would output the probability of the input image being a real sample.

Figure 1B:
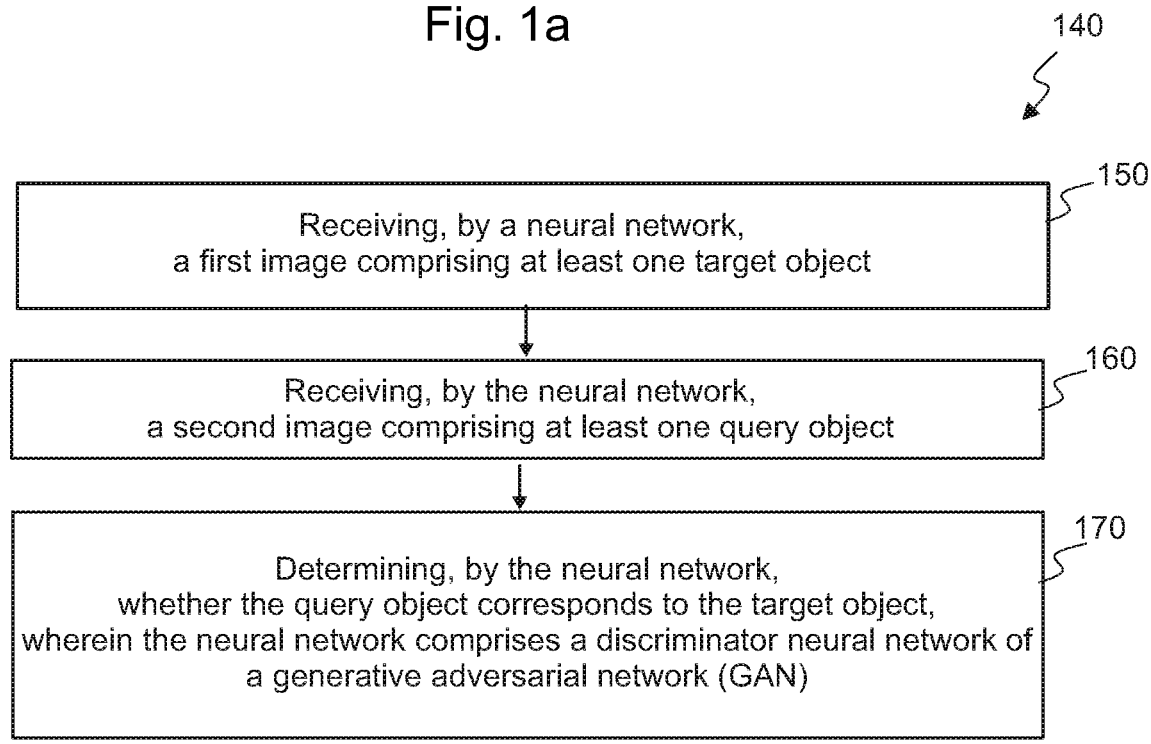
FIG. 1b shows a method for using a reverse Generative Adversarial Network for object re-identification according to an embodiment.

FIG. 1b shows a method 140 for using a neural network for object re-identification according to an embodiment of the invention. The neural network may be a rGAN, that is, as already above explained, an example of a Generative Adversarial Network. The neural network is trained for object re-identification.

At first, in block 150, a first image comprising at least one target object is received by the neural network. The receiving may mean selecting the image from a plurality of images, actual receiving of the image from a memory or via network or other determining of the image.

In block 160, a second image comprising at least one query object arranged to be compared to the target object is received by the neural network. The second image may comprise, for example, at least a portion of a current video frame and the first image comprises at least a portion of a previous video frame. Current video frame may be a video frame comprising an object arranged to be detected i.e. re-identified in order to determine if the object of the current video frame is the same object as in the first image that is the previous video frame. The second image may be received from a generator neural network that is a part of the neural network or may be a real (non-generated) image containing the same object as in the first image but captured either from a different location, from a different capture device or at a different time, or a combination thereof.

In block 170, it is determined by the neural network, whether the query object of the second image corresponds to the target object of the first image. The neural network comprises a discriminator neural network of a generative adversarial network (GAN). The discriminator neural network is trained by using the generator of the neural network. The generator neural network is configured to receive a modified version of the previous video frame to provide an estimate of the current video frame that is, for example, an image wherein the at least one extracted feature is replaced, to the discriminator neural network. In addition, the modification of the previous video frame performed to create the modified image comprises extracting at least one characterizing feature from the previous video frame. The modified version of the previous video frame is a version of the first image, wherein at least one key feature of an object is extracted from the image (video frame). The generator neural network is trained by the re-identification model (discriminator D1), and by a second discriminator neural network (D2) configured to determine whether the estimate of the current video frame generated by the generator neural network is realistic or fake i.e. non-realistic.

Figure 2A:
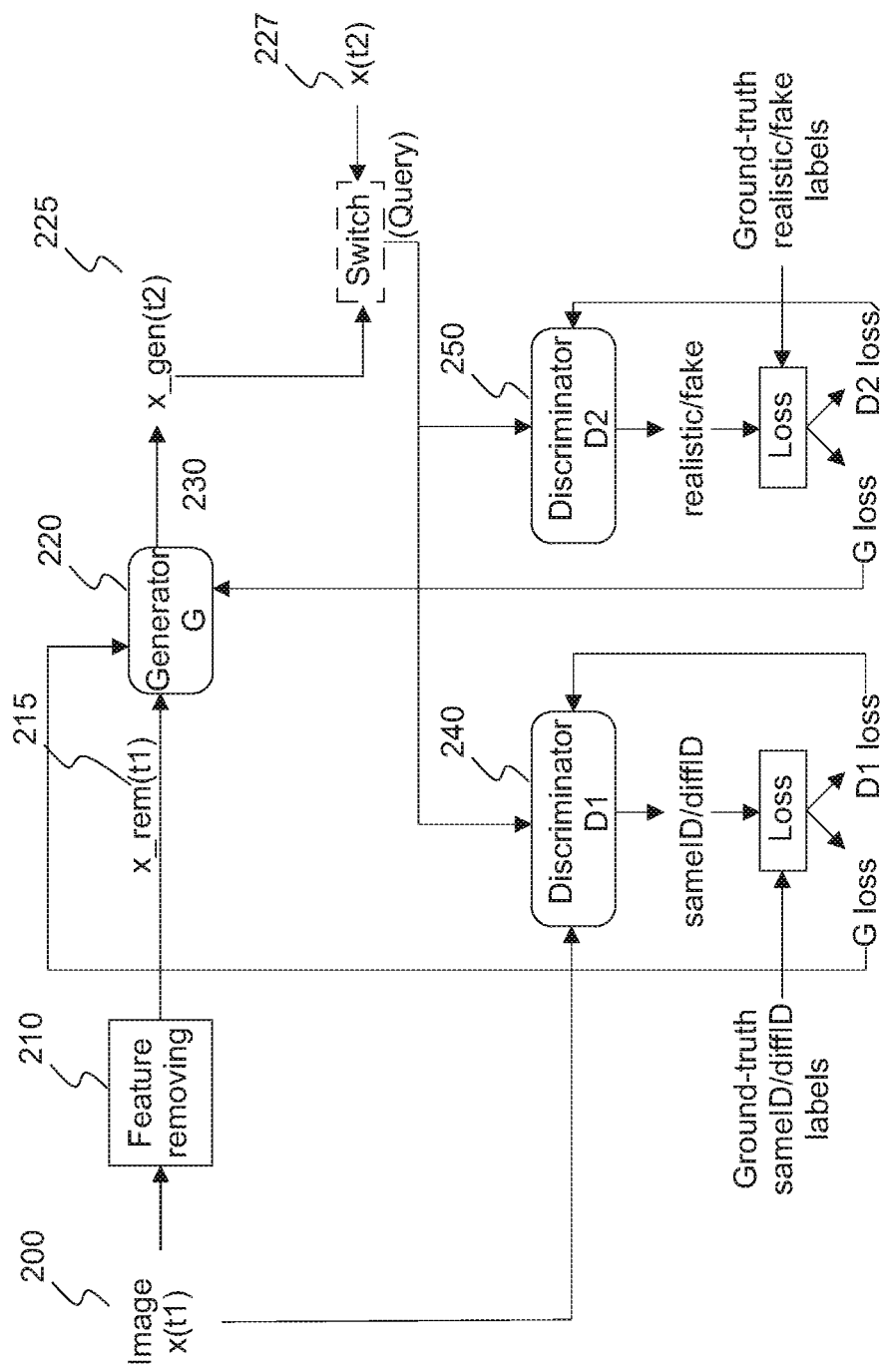
FIG. 2a-d show a block chart for training and using a reverse Generative Adversarial Network for object re-identification according to an embodiment of the invention.

FIG. 2a shows an example of architecture of a Generative Adversarial Network, GAN, which is configured to train a discriminator network for object re-identification according to an embodiment of the invention. The input to the GAN is at least one image x(t1) 200 comprising a target object arranged to be re-identified from other images Instead of an image, any other media content object, such as a video file, could be used as input as well. The feature-removed images x_rem(t1) 215 may be created from the at least one image x(t1) 200 by applying feature extracting and removal 210 to the at least one image frame x(t1) 200. Feature extracting may for example comprise determining, manually by a user or by a pre-trained neural network or other model, one or more objects in image x(t1) and removing these objects from the image.

In FIG. 2a, a neural network generator G 220 is used to generate objects having differences in at least one key feature i.e. the generator G 220 creates generated images x_gen (t2) 225 comprising target objects having at least one replaced key feature from feature-removed images x_rem (t1) 215. The generated query images x_gen (t2) 225 are then inputted to a switch 230.

The switch 230 is arranged to select input query images for discriminators D1 240 and D2 250. The selected input query image may either be a generated query image x_gen (t2) 225 comprising the generated object or a real query image x(t2) 227 comprising the same target object as x(t1) 200, for example, the same person, but either from another time in the same video (hence the time index t2), or from another image, for example, a different photograph of the same image target, for example, of the same person. More generally, the generated query image or real query image may comprise an image at time instant $t_2$ and the target image comprising the same target object may comprise an image at time instant $t_1$. The images at time instants $t_1$ and $t_2$ may represent video frames of the same video stream at corresponding time instants or frame indices.

The discriminators D1 240 and D2 250 are not informed which input query object was selected by the switch 230, and thus they need to learn to distinguish whether the object in received image is the generated query image x_gen(t2) 225 or the real query image x(t2). In other words, the discriminators D1 240 and D2 250 are trained to learn to classify the generated query images x_gen(t2) 225 and the real query image x(t2) 227 correctly between real and generated objects.

The discriminator D1 240 is conditioned on the target image x(t1) 200 and either the generated query image x_gen(t2) 225 or the real query image x(t2) 227. Thus, it is configured to output the probability that the query image (x_gen(t2) 225 or x(t2) 227) contains the same object as the object in the target image x(t1) 200, thus learning to perform re-identification.

The loss for training the discriminator D1 240 is a cross-entropy loss computed from an output of the discriminator D1 240 and correct label, for example the label is 1 if the query is real and the label is 0 if query is generated. The loss for training the generator G 220 provided through the discriminator D1 240 is the cross-entropy loss computed from the output of the discriminator D1 240 output and reversed labels, for example the label is 1 if the query is generated and the label is 0 if the query is real.

The discriminator D2 250 receives either the generated query image x_gen(t2) or the real query image x(t2) and it is configured to classify the input image as realistic or fake. D2 may be implemented as a Convolutional Neural Network classifier, which outputs the probability that the input is a real (non-generated) sample. This network is trained by using cross-entropy loss, where label is for example 1 if input is real and label is 0 if input is generated. The discriminator D2 250 provides a loss for training the generator G 220 by reversing the labels.

The loss for training the generator G 220 through the discriminator D2 250 is the cross-entropy loss computed from the output of the discriminator D2 250 and using reversed labels, i.e., generated input is labelled as real whereas real input is labelled as generated.

The two contributions to the loss for training the generator G 220, computed from outputs of the discriminators D1 240 and D2 250, may then be combined, for example, by a linear combination of the two losses, where the weights for each loss represent hyper-parameters to be optimized either manually or automatically, for example, utilizing grid search, meta-learning, etc. or by a method, wherein the two losses are applied alternately, for example, such as one loss for N1 iterations, and the other loss for other N2 iterations. Herein term "applying a loss" means using the loss for updating the weights of the generator G 220 using an optimizer routine, such as stochastic gradient descent. The losses are derived from the cross-entropy loss. The loss computed through the discriminator D1 240 and applied to train the discriminator D1 240 represents the error of the discriminator D1 240 in classifying the input query correctly (i.e. whether the query contains the same object as in target sample). The loss computed through the discriminator D1 240 and applied to train the generator G 220 represents the error of the generator G 220 in generating a sample which looks same as the target object. The loss computed through the discriminator D2 250 and applied to train the discriminator D2 250 represents the error of the discriminator D1 240 in classifying the input sample correctly (whether the input is realistic or not). The loss computed through the discriminator D2 250 and applied to train the generator G 220 represents the error of the generator G 220 in generating samples which look realistic.

The discriminator D1 240 may be regarded as the final re-identification model i.e. re-identifier after training. The trained discriminator D1 240 may be therefore utilized in re-identification without other parts of the GAN. The generator G 220 may be kept for future re-use for further training the system. In case of an online learning scenario that may be kept for a default scenario for future machine learning products, where models continuously receive new streams of data and keep on learning, the whole system comprising the generator G 220, discriminator D1 240, discriminator D2 250 and the model which extracts key features may be part of the deployed system.

As an additional embodiment, the discriminator D1 240 may be initialized with a model which is trained on non-edge cases such as using object-tracking datasets. If object-tracking datasets are used, there may be a need to use suitable techniques for this so called "continual learning" that means avoiding to destroy the initial information contained in the discriminator D1 240. One possibility is to use a lower learning rate (for example, 0.0001) with respect to the learning rate previously used for training on non-edge cases (for example, 0.01), but also other suitable techniques may be used, such as elastic weight consolidation (EWC). EWC algorithm slows down learning on certain weights based on how important they are to previously seen tasks. EWC can be used in supervised learning and reinforcement learning problems to train several tasks sequentially without forgetting older ones.

Figure 2B:
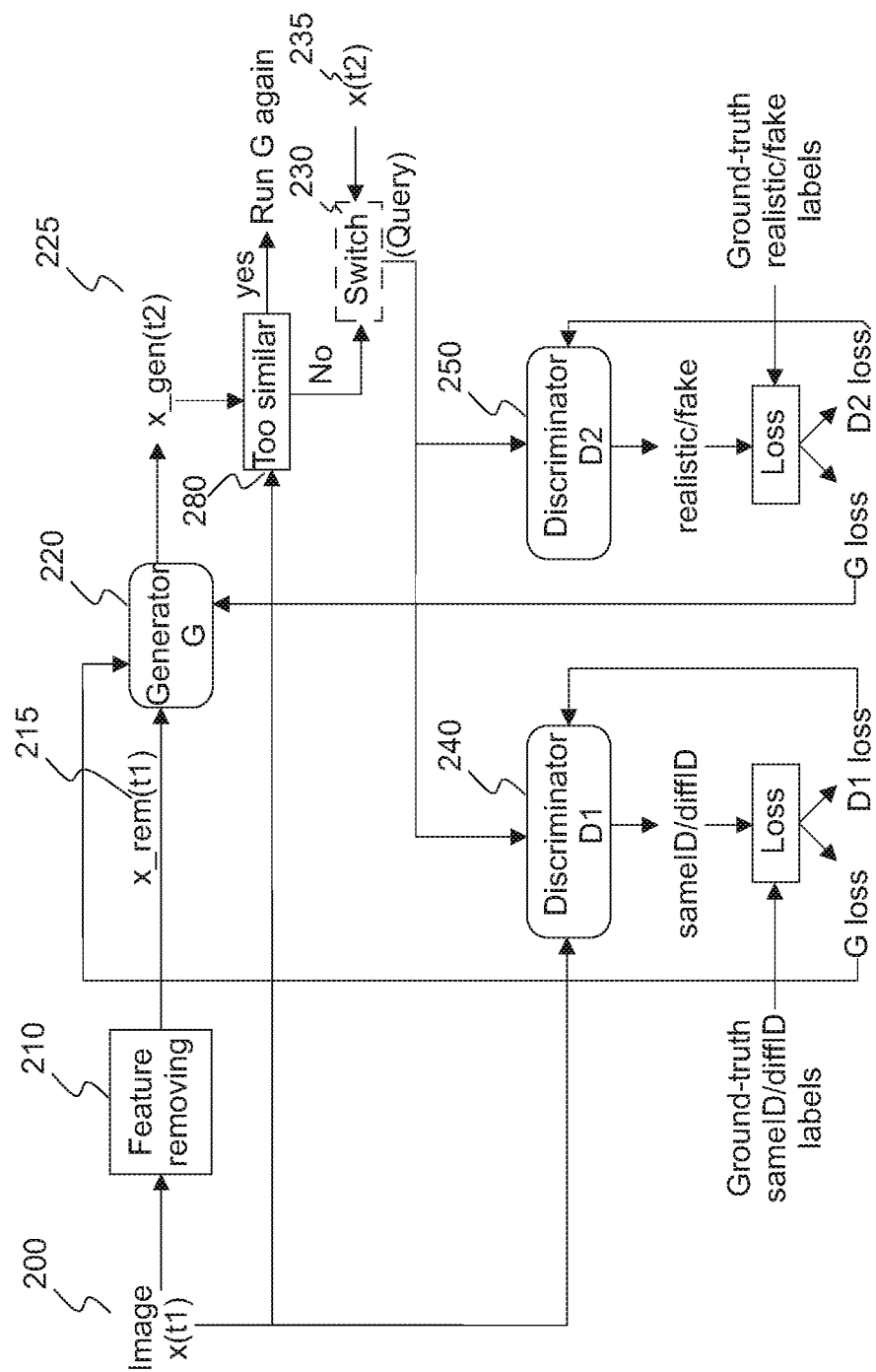

FIG. 2b also shows an example of architecture of a Generative Adversarial Network arranged to be trained and used for object re-identification according to an embodiment of the invention. This embodiment further comprises a comparison block 280 between the generator G 220 and the switch 230 in addition to the architecture of FIG. 2a. As already explained above, the generator G 220 is arranged to imagine the missing key feature area(s) of an object, which key feature(s) is extracted by the feature extracting block 210, by providing a vast amount of possible pixel combinations to replace the extracted part(s) of the object. Even if there may be a very little probability that the generator G 220 will imagine exactly the same key features as in the original object meaning that it is unlikely that the generator G 220 provides corresponding key features as in the original object to replace the extracted ones. In order to make this constraint even stronger, the generated objects x_gen(t2) 225 and the images x(t1) 200 comprising target objects are compared in the comparison block 280 using a metric such as mean squared error and if result value of this comparison is below a predetermined threshold value the generated samples are discarded, which means that a generated query object x_gen(t2) 225 is too similar to the original object of an image x(t1) 200.

Figure 2C:
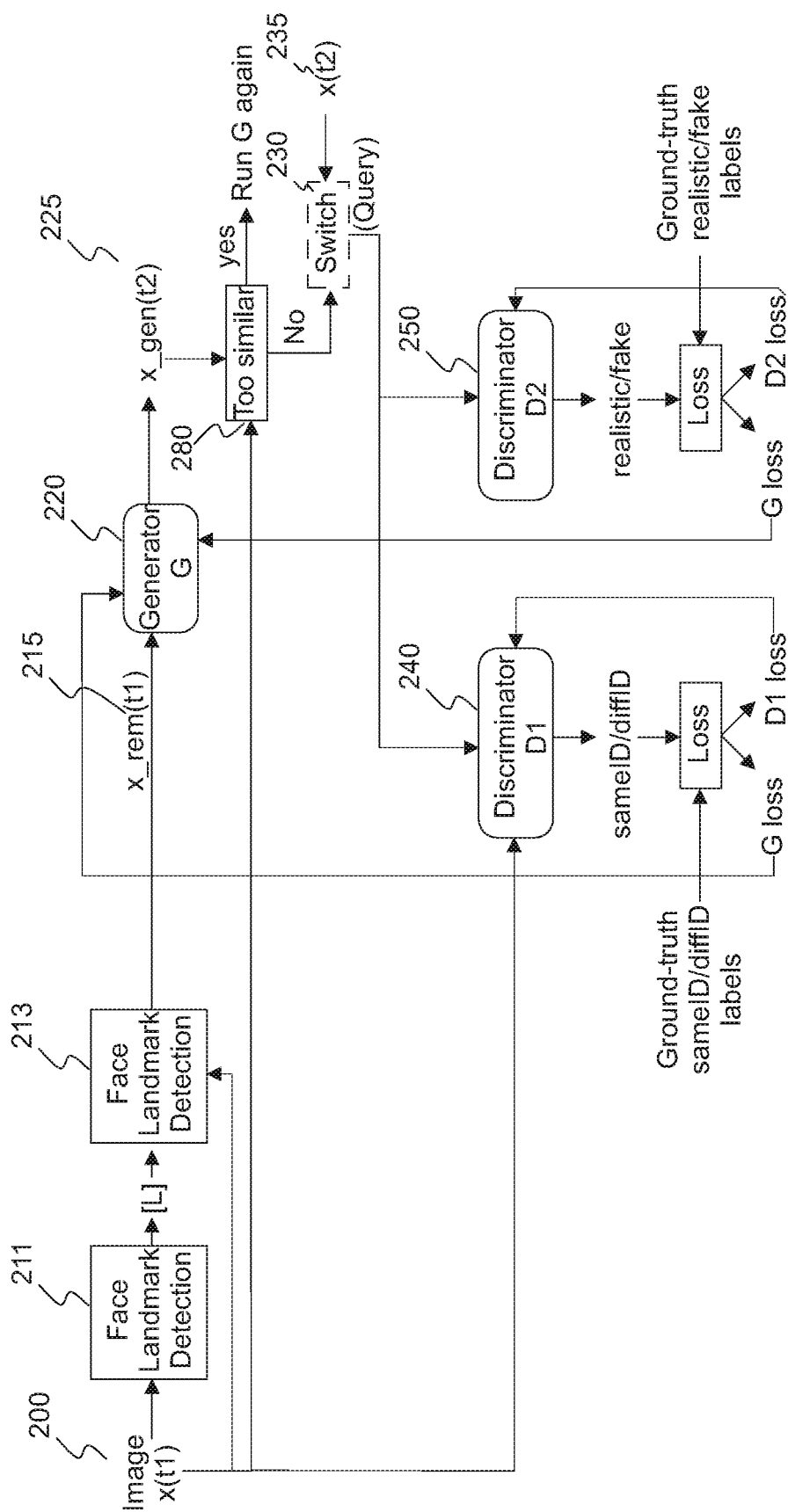

FIG. 2c shows an example of architecture of a Generative Adversarial Network arranged to be trained and used for object re-identification according to an embodiment of the invention, wherein feature extracting is performed by applying a face landmark detection algorithm according to an embodiment. This algorithm would detect face landmarks or key features such as eyes, nose, etc. and output a location, a bounding box or a segmentation mask providing information about the location of the landmarks. Feature extracting and removal comprises a face landmark detection block 211 and remove landmark block 212 that actually extracts i.e. removes the parts detected by the previous block 211 in order to allow the generator G 220 to generate differences in the key features of the objects. [L] in the FIG. 2c represents the set of landmarks, which may be, for example, a segmentation mask, a set of bounding boxes, for example, rectangles coordinates, or a set of locations, for example, central point of the landmark. These images are also generated images x_gen(t2) 225. The Face Landmark Detection algorithm may be implemented as a pre-trained neural network.

In this FIG. 2c, the comparison block 280 is included in the architecture, but it is possible that it is not a part of the GAN circuit.

Figure 2D:
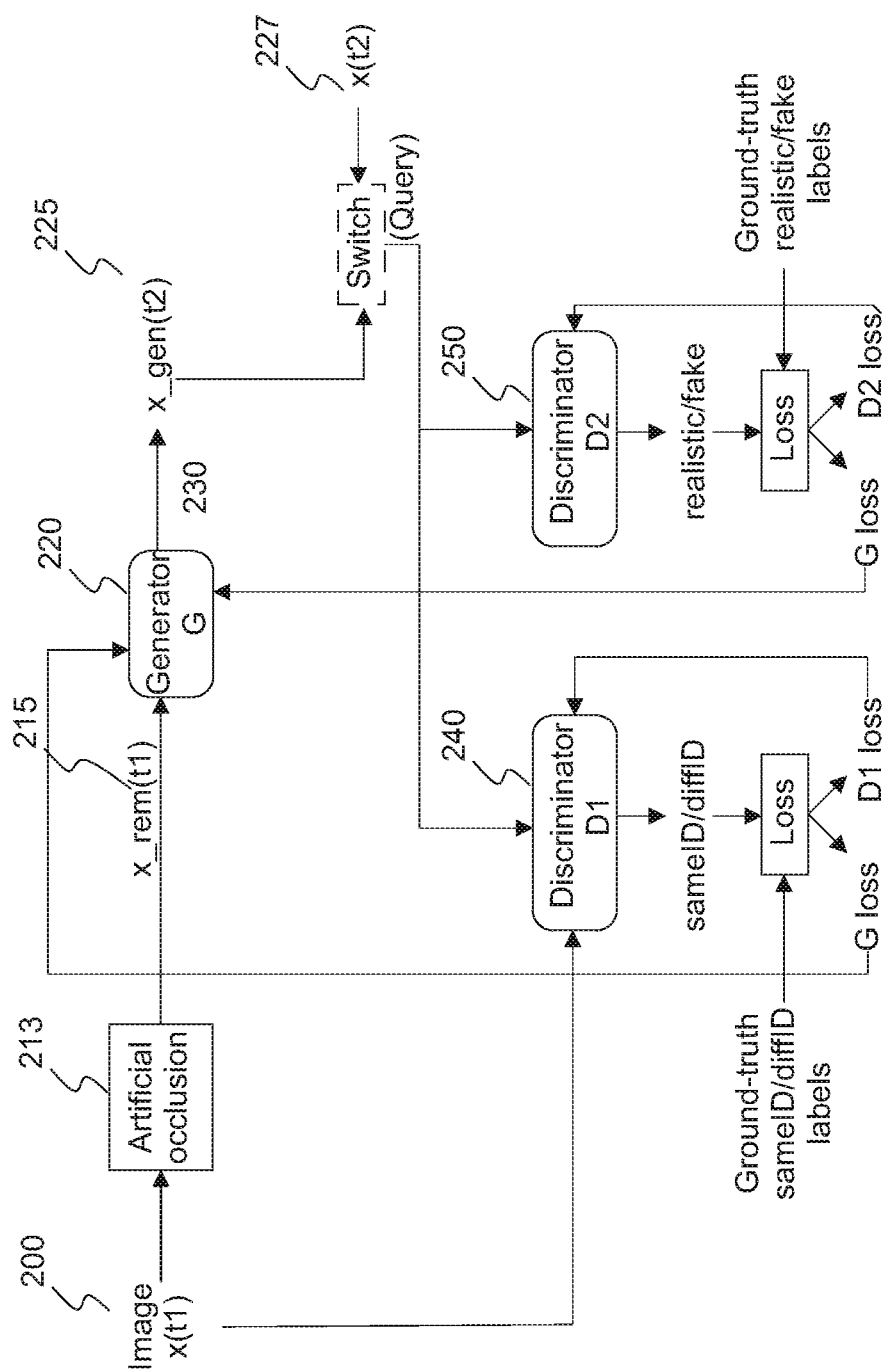

FIG. 2d shows an example of architecture of a Generative Adversarial Network arranged to be trained and used for object re-identification according to an embodiment of the invention, wherein feature extracting is performed by applying artificial occlusion according to an embodiment. Herein, the term "occluded" refers to a real or virtual first object residing in front of a second object, for example, face images, such that at least part of the second object is occluded. The term "non-occluded" or "unconcluded" refers to a situation where no part of the second object is occluded by the first object in the original image created by the image-production device, such as a camera or a computer graphics system. The term "disoccluded" refers to a situation where, as a result of some image processing operations, the occlusion created by the first object on the second object has been at least partly extracted, suppressed, or cancelled.

As generally known, neural networks are trained to operate in desired manner. Therefore, also the artificial occlusion may be implemented as a pre-trained neural network. This network may be trained jointly with all the other networks (G, D1 and D2), by encouraging it to occlude areas which would make the generator's task difficult, for example, by encouraging it to occlude areas which would be difficult to generate very similar to the target image. This may be implemented by training this additional network using the same losses used for training the discriminators D1 and D2. This way, this network would act adversarially with respect to the generator. The images comprising artificially occluded objects may be generated by applying artificial occlusion 213 to unoccluded images, for example, face images x(t1) 200.

At least one, but possibly multiple images comprising unoccluded face images x(t1) 225 about the same person as depicted in the artificially occluded face images are provided to the generator G 220. The generator G 220 generates one or more image frames with disoccluded face images about the person. These images are also called as generated images x_gen(t2) 225.

According to an embodiment, the neural network generator 220 may be trained to implement a pre-trained face detector and/or tracker. The face detector/tracker may be utilized to decide the area of occlusion both in training and inference phases. The area of the artificial occlusion and thus the area subject to the inpainting can be either a static location within the frames detectable by the face detector, whereupon the frames may be relocated and scaled based on face movement, or it can be changing over time, thus being detectable by the face tracker. If the area of the artificial occlusion changes over time, the generator and discriminators may receive additional feature map(s) onto which the location mask is marked. The artificial occlusion can be, for example, just a blank single-color mask or a randomized pattern. In the case of blank mask, the generator may be provided with another source of randomness for the GAN training to work properly and cover all the necessary statistical modes in the data.

In this FIG. 2d, there is not a comparison block 280 but it is possible to include it to the GAN circuit.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The apparatus may comprise means for performing steps of methods as described in the claims and throughout the specification.

It is obvious that the present invention is not limited solely to the above-presented embodiments, but it can be modified within the scope of the appended claims.

The invention claimed is:

1. A method comprising:
receiving, by a neural network, a first image comprising at least one target object, wherein the neural network comprises a discriminator neural network of a generative adversarial network (GAN);
extracting a characterizing feature from the at least one target object by removing visual content of the feature;
replacing the visual content with visual noise or a visual pattern to generate an estimate of the first image having at least one generated object;
receiving, by the neural network, a second image comprising at least one query object, the at least one query object comprising the at least one target object captured in a manner different from the at least one target object of the first image; and
training the discriminator neural network to discriminate between the second image comprising the at least one query object and the estimate of the first image having the at least one generated object based upon a determined correspondence to the first image.

2. The method according to claim 1, wherein the second image comprises at least a portion of a current video frame and the first image comprises at least a portion of a previous video frame.

3. The method according to claim 2, wherein the discriminator neural network is trained by using a generator neural network configured to receive a modified version of the previous video frame and to provide an estimate of the current video frame to the discriminator neural network.

4. The method according to claim 3, wherein the modification of the previous video frame comprises extracting at least one characterizing feature from the previous video frame.

5. The method according to claim 4, wherein the characterizing feature is at least one of a nose, eyes or lips of a face.

6. The method according to claim 3, wherein the generator neural network is trained by a second discriminator neural network configured to determine whether the estimate of the current video frame generated by the generator neural network is realistic or fake.

7. The method according to claim 1, wherein the discriminator neural network is trained by using a generator neural network configured to receive a modified version of the first image.

8. The method according to claim 1, wherein the at least one query object comprises the at least one target object captured from a location different from a location at which the at least one target object of the first image was captured, by a capture device different from a capture device with which the at least one target object of the first image was captured, at a time different from a time the at least one target object of the first image was captured, or a combination thereof.

9. An apparatus comprising at least one processor and memory including computer program code, the memory and the computer program code configured to, with the at least one processor, cause the apparatus to perform:

receive, by a neural network, a first image comprising at least one target object, wherein the neural network comprises a discriminator neural network of a generative adversarial network (GAN);

extract a characterizing feature from the at least one target object by removing visual content of the feature;

replace the visual content with visual noise or a visual pattern to generate an estimate of the first image having at least one generated object;

receive, by the neural network, a second image comprising at least one query object, the at least one query object comprising the at least one target object captured in a manner different from the at least one target object of the first image; and train the discriminator neural network to discriminate between the second image comprising the at least one query object and the estimate of the first image having the at least one generated object based upon a determined correspondence to the first image.

10. The apparatus according to claim 9, wherein the second image comprises at least a portion of a current video frame and the first image comprises at least a portion of a previous video frame.

11. The apparatus according to claim 10, wherein the discriminator neural network is trained by using a generator neural network configured to receive a modified version of the previous video frame and to provide an estimate of the current video frame to the discriminator neural network.

12. The apparatus according to claim 11, wherein the modification of the previous video frame comprises extracting at least one characterizing feature from the previous video frame.

13. The apparatus according to claim 12, wherein the characterizing feature is at least one of a nose, eyes or lips of a face.

14. The apparatus according to claim 11, wherein the generator neural network is trained by a second discriminator neural network configured to determine whether the estimate of the current video frame generated by the generator neural network is realistic or fake.

15. The apparatus according to claim 9, wherein the discriminator neural network is trained by using a generator neural network configured to receive a modified version of the first image.

16. A computer program product embodied on a non-transitory computer readable medium, comprising computer program code configured to, when executed on at least one processor, cause an apparatus or a system to perform:

receive, by a neural network, a first image comprising at least one target object, wherein the neural network comprises a discriminator neural network of a generative adversarial network (GAN);

extract a characterizing feature from the at least one target object by removing visual content of the feature;

replace the visual content with visual noise or a visual pattern to generate an estimate of the first image having at least one generated object;

receive, by the neural network, a second image comprising at least one query object, the at least one query object comprising the at least one target object captured in a manner different from the at least one target object of the first image; and train the discriminator neural network to discriminate between the second image comprising the at least one query object and the estimate of the first image having the at least one generated object based upon a determined correspondence to the first image.

17. The computer program product according to claim 16, wherein the second image comprises at least a portion of a current video frame and the first image comprises at least a portion of a previous video frame.

18. The computer program product according to claim 17, wherein the discriminator neural network is trained by using a generator neural network configured to receive a modified version of the previous video frame and to provide an estimate of the current video frame to the discriminator neural network.

19. The computer program product according to claim 18, wherein the modification of the previous video frame comprises extracting at least one characterizing feature from the previous video frame.

20. The computer program product according to claim 19, wherein the characterizing feature is at least one of a nose, eyes or lips of a face.

21. The computer program product according to claim 16, wherein the discriminator neural network is trained by using a generator neural network configured to receive a modified version of the first image.

* * * * *